No. 814,462. PATENTED MAR. 6, 1906.
B. LEVISON.
TWINE HOLDER.
APPLICATION FILED APR. 18, 1905.
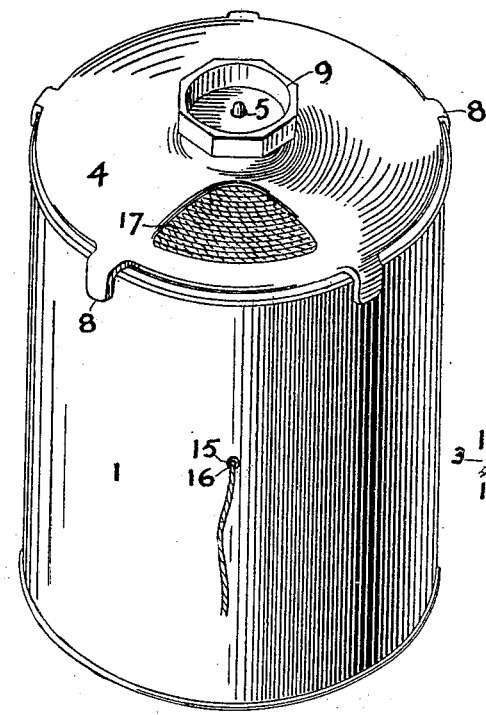
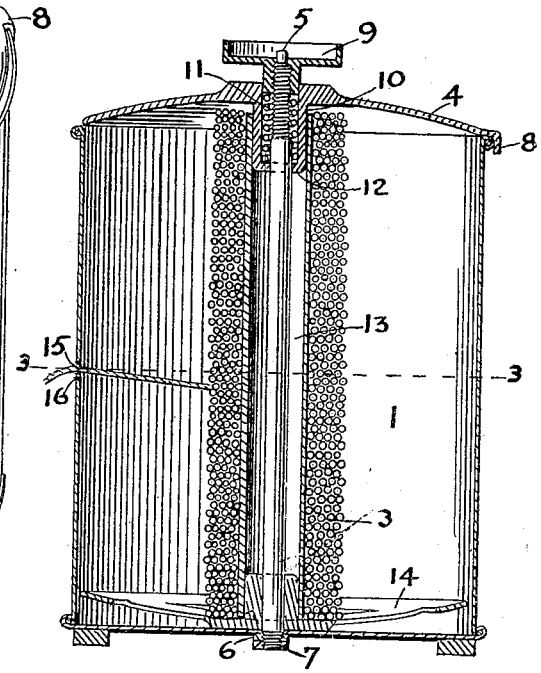
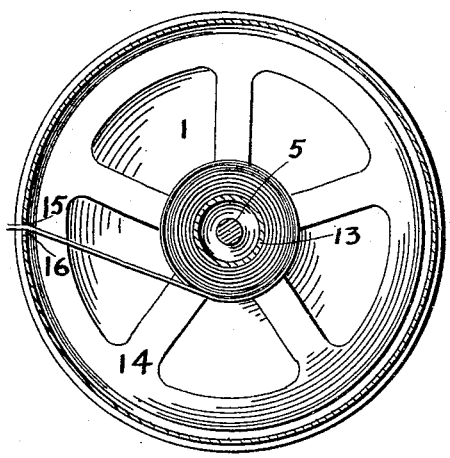
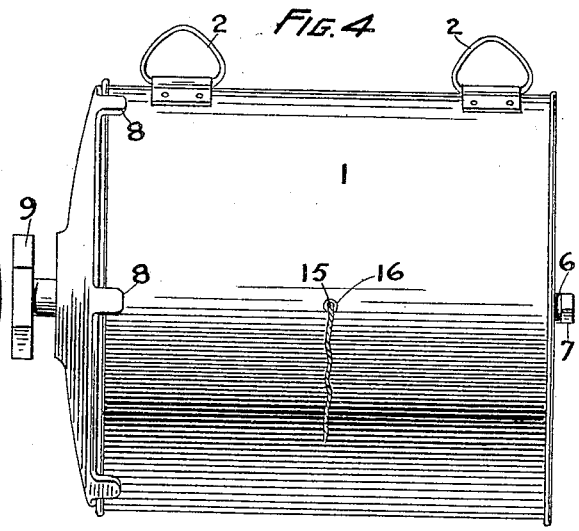
WITNESSES:
INVENTOR:
Benj. Levison
By F. M. Wright
Attorney.

UNITED STATES PATENT OFFICE.

BENJAMIN LEVISON, OF SAN FRANCISCO, CALIFORNIA, ASSIGNOR OF ONE-THIRD TO ALEXANDER LEVISON AND ONE-THIRD TO HARRY LEVISON, OF SAN FRANCISCO, CALIFORNIA.

TWINE-HOLDER.

No. 814,462.  Specification of Letters Patent.  Patented March 6, 1906.

Application filed April 18, 1905. Serial No. 256,232.

*To all whom it may concern:*

Be it known that I, BENJAMIN LEVISON, a citizen of the United States, residing at San Francisco, in the county of San Francisco and State of California, have invented certain new and useful Improvements in Twine-Holders, of which the following is a specification.

This invention relates to an improved twine-holder, the object of the invention being to provide a holder for twine wound in the form of a cylinder, which while allowing the twine to be freely drawn from the cylinder of twine will prevent the twine running from the holder after the pull thereon has ceased.

An economical method of winding twine is that which is known as the "universal wind," which dispenses with the necessity of ends for the reel on which the twine is wound, the twine being so wound as to turn back in its winding when it has reached the end of the cylinder; but up to the present time there has been no satisfactory holder for a cylinder of twine so wound. The general custom has been to suspend the cylinder of twine with its axis horizontal and to pull down the twine as required, causing the cylinder to revolve; but the effect is to pull off more twine than is necessary for the immediate requirements.

The object of the present invention is to provide means whereby this will be avoided.

Another object of the invention is to provide a holder which will keep the twine clean, since it sometimes happens that a reel of twine will be exposed for a long time without being used, in which case it becomes soiled with the dust.

In the accompanying drawings, Figure 1 is a perspective view of the holder in use in one position. Fig. 2 is a vertical section. Fig. 3 is a horizontal section on the line 3 3 of Fig. 2. Fig. 4 is a side view of the holder in another position.

Referring to the drawings, 1 represents a cylindrical can which in use may either stand on one end, as shown in Fig. 1, or may be suspended by eyes 2, with its axis horizontal, as shown in Fig. 4. Said can is closed at one end, and the cylinder of twine (shown at 3) may be inserted through the open end and then covered with a lid 4.

In the axis of the cylindrical can is a shaft 5, which passes at one end through a hole in the closed end of the can and is there secured by a washer 6 and nut 7 and at the other end passes through a hole in the center of a lid 4, which lid at its periphery has lugs 8, bent down to extend over the edge of the open end of the can and center the lid and shaft. This lid closes the end of the can and keeps the twine clean. It is provided with an opening, 17, however, which permits inspection of the twine to ascertain at any time how much is left in the holder. A nut 9 is screwed on the threaded upper end of said shaft, passing loosely through said hole. Within a hub 10 of said lid, through which the end of the shaft 5 passes, is inserted a spring 11, the lower end of which rests upon a shoulder 12 in said hub and also bears at its upper end against said nut and by its spring-pressure holding the nut in place without the necessity of tightening it up to prevent its unscrewing by use. The tubular shaft 13 of the cylinder of twine is passed on to this shaft 5, and the cylinder rests upon a concavo-convex carrier plate or disk 14, which revolves on the central portion of its convex side in the bottom of the can around the shaft. The end of the twine is passed through a hole 15 in the center of the periphery of the can, in which hole is inserted an eyelet 16, which prevents cutting of the twine.

In operation a pull upon the twine draws it out through the hole 15, and it is found in practice that only such amount is drawn therefrom as corresponds to the length of the pull exerted. It is also to be noted that the pull being toward the center of the cylinder prevents any of the twine reeling off the edges.

In the prior construction above referred to after a pull is given to the twine the cylinder would continue to revolve, unwinding the twine much more than was necessary. With the present construction the cylinder may also continue to revolve, but without occasioning any inconvenience, because the twine thus wound off the cylinder still remains in the can and only as much twine is actually withdrawn from the can through the hole as is necessary. The twine which has thus been unwound and remains in the cylinder will be drawn out on the next succeeding pull.

In Fig. 4 the can is shown as provided with loops 2, by which it can be suspended with the axis horizontal.

I claim—

1. In combination, a cylindrical can, closed at one end, an axial shaft secured to said closed end, a carrier plate or disk revolubly supported in the bottom of the can around the shaft, said shaft extending upward above said disk sufficiently far and the upper end of the shaft being free to permit a hollow cylinder of twine to be placed around the shaft at its free end to rest on the carrier, and means for closing the other end of the cylinder, said cylinder having an aperture in its side to permit the twine to be drawn therethrough, substantially as described.

2. In combination, a cylindrical can, closed at one end, an axial shaft secured to said closed end, a carrier plate or disk revolubly supported in the bottom of the can around the shaft, said shaft extending above said carrier sufficiently to permit a hollow cylinder of twine to be placed on the carrier around the shaft, a lid through the center of which the shaft passes and having a shouldered hub, a spring within the hub resting upon said shoulder, and a nut upon the upper threaded end of the shaft, the can having an aperture in its side to permit the twine to be drawn therethrough, substantially as described.

In witness whereof I have hereunto set my hand in the presence of two subscribing witnesses.

BENJAMIN LEVISON.

Witnesses:
 FRANCIS M. WRIGHT,
 BESSIE GORFINKEL.